(12) United States Patent
Schuetze et al.

(10) Patent No.: US 9,631,648 B2
(45) Date of Patent: Apr. 25, 2017

(54) FLOW BODY WITH LOW-FRICTION SURFACE STRUCTURE

(71) Applicant: Phitea GmbH, Berlin (DE)

(72) Inventors: Werner Schuetze, Berlin (DE); Alexander Slaza, Berlin (DE)

(73) Assignee: Phitea GmbH, Berlin (DE)

( * ) Notice: Subject to any disclaimer, the term of this patent is extended or adjusted under 35 U.S.C. 154(b) by 0 days.

(21) Appl. No.: 14/772,842

(22) PCT Filed: Mar. 5, 2014

(86) PCT No.: PCT/IB2014/059465
§ 371 (c)(1),
(2) Date: Sep. 4, 2015

(87) PCT Pub. No.: WO2014/136066
PCT Pub. Date: Sep. 12, 2014

(65) Prior Publication Data
US 2016/0010670 A1      Jan. 14, 2016

(30) Foreign Application Priority Data

Mar. 5, 2013  (DE) .................. 10 2013 102 181

(51) Int. Cl.
*F15D 1/00* (2006.01)
*B64C 21/10* (2006.01)
*F15D 1/12* (2006.01)

(52) U.S. Cl.
CPC ............. *F15D 1/003* (2013.01); *B64C 21/10* (2013.01); *F15D 1/12* (2013.01); *B64C 2230/26* (2013.01); *Y02T 50/166* (2013.01)

(58) Field of Classification Search
CPC ... B64C 21/10; B64C 2230/26; Y02T 50/166; F15D 1/00; F15D 1/003; F15D 1/12; Y10T 428/24479
USPC ........................................... 428/156
See application file for complete search history.

(56) References Cited

U.S. PATENT DOCUMENTS

2008/0172121 A1 *  7/2008  Scholz .............. A61F 2/06
                                                 623/1.13
2011/0315248 A1   12/2011  Simpson et al.

FOREIGN PATENT DOCUMENTS

DE     102004010747 A1   10/2004
JP         05010696 A  *  1/1993
JP       2001050215 A    2/2001

OTHER PUBLICATIONS

Translation of JP 05010696A.*

* cited by examiner

*Primary Examiner* — Catherine A Simone
(74) *Attorney, Agent, or Firm* — Michael Soderman

(57) ABSTRACT

The invention relates to a flow body with a surface that has a pyramidal elevation (1) in at least one location. The elevation (1) has a rhombic base here; a first diagonal (D1) of the rhombic base is aligned in the direction of flow (S) when the flow body is in use and it has a length ratio of between 5 and 8 with respect to the second diagonal (D2).

9 Claims, 5 Drawing Sheets

FLOW BODY WITH LOW-FRICTION SURFACE STRUCTURE

CROSS-REFERENCE TO RELATED APPLICATIONS

This application is the U.S. national stage of International Application No. PCT/IB2014/059465 filed on Mar. 5, 2014, and claims the benefit thereof. The international application claims the benefit under 35 USC 119 of German Application No. 102013102181.6 filed on Mar. 5, 2013; all applications are incorporated by reference herein in their entirety.

BACKGROUND

The invention relates to a flow body with a surface that is structured to lower resistance. Wings of aircraft, rotor blades of helicopters and aircraft, wind power stations and fan wheels, as well as turbine blades and the like, as examples, are understood to be flow bodies in the sense of the invention. A part of these bodies is also understood to be a flow body in the sense of the invention here. In the broadest sense of the invention, all bodies that have at least one surface that a medium flows over are understood to be flow bodies.

Reduction of resistance of the surface of a flow body via structural modification of the surface has long since been part of the prior art.

Artificial shark skin that has a riblet structure with microscopically small grooves along the direction of flow is used as an example. The corresponding formation of eddies is minimized by the riblet structure when the medium flows, and flow with less friction is therefore made possible. Swimsuits that use this effect are also part of the prior art. A golf ball is a different example. Non-smooth surfaces bring about reduced friction of the flow body in both cases. Even more structures, for instance dolphin skin, are known in the prior art that lead to a reduction in flow resistance.

The solutions known from the prior art have the drawback that they either do not reduce the frictional resistance with enough efficiency and are prone to get dirty, causing the frictional resistance to increase in the course of time, or they are very expensive to manufacture.

SUMMARY

The invention relates to a flow body with a surface that has a pyramidal elevation (1) in at least one location. The elevation (1) has a rhombic base here; a first diagonal (D1) of the rhombic base is aligned in the direction of flow (S) when the flow body is in use and it has a length ratio of between 5 and 8 with respect to the second diagonal (D2).

DETAILED DESCRIPTION

The object of the instant invention is to provide a flow body that has a resistance-reducing surface and that also has an alternative structure in comparison with the known structures. In so doing, the flow body as per the invention should be more economical to manufacture than other flow bodies with a structured, resistance-reducing surface and with a comparable reduction in the resistance coefficient. The object of the invention is to also provide a process for structuring surfaces of flow bodies via which the coefficient of resistance of flow bodies can be improved in a cost-efficient and sustainable way.

This problem is solved with a flow body comprising a surface that has a pyramidal elevation in at least one location; the pyramidal elevation has a rhombic base. This means, explicitly, that the flow body itself is not a pyramidal elevation; instead, a pyramidal elevation is arranged on it.

A first diagonal of the rhombic base is arranged in such a way that it is aligned in the direction of flow when the flow body is in use. Since different flow directions frequently prevail for flow bodies during different usage states and the alignment of the first diagonals of the pyramidal elevations cannot change along with them during operation, a compromise has to be chosen here when the pyramidal elevations are aligned. "Aligned in the direction of flow" accordingly means that at least one pyramidal elevation of the flow body is aligned in the direction of flow along its longer diagonal during at least one operating state.

The length ratio between the first and the second diagonals of the rhombic base of the pyramidal elevation is between 5 and 8 as per the invention. The height of the elevation preferably corresponds to around one-fourth of the length of the first diagonal aligned in the direction of flow.

The length of the diagonals of the pyramidal elevation is preferably between 6 nm and 60 mm here.

In accordance with one embodiment of the invention, the surface of the flow body has at least two elevations one after the other in the direction of flow. The rear elevation, i.e. the downstream elevation, is preferably lower than the upstream elevation in the direction of flow; as a special preference, the height of the elevation that is downstream in the direction of flow is only half of the upstream elevation in the direction of flow. Three or more of these elevations, each with a reduced height vis-a-vis the upstream elevation, are preferably provided. In accordance with another embodiment, there is a break in the structure after this series of elevations with a reduced height in each case, and an elevation with the original height follows once again, as well as subsequent elevations with a reduced height in each case.

According to an especially preferred embodiment of the invention, the surface of the pyramidal elevations likewise have small pyramidal elevations. It turned out, surprisingly, that the simultaneous use of resistance-reducing elevations with at least two different orders of magnitude has an especially strong effect on the reduction of resistance of the flow body. The structures that are positioned on top of one another preferably have a similar geometric structure. As a special preference, the diagonal length of the pyramidal elevation that rests on a larger pyramidal elevation has between one-tenth and one one-hundredth of the diagonal length of the larger pyramidal elevation.

In accordance with a further embodiment, the surface of the flow body as per the invention has at least two pyramidal elevations that are arranged at an offset to one another and essentially orthogonal to the direction of flow.

The flow body preferably has a number of elevations orthogonal to the direction of flow that, as a special preference, are arranged along the leading edge. A number of elevations are also preferably arranged on the surface of the flow body as per the invention, however.

According to one embodiment, the lengths of the diagonals of the rhombic base of the pyramidal elevation are shorter in the area of the flow body in which there is a higher flow velocity than in the areas with a lower flow velocity. The ratio of the two diagonal lengths vis-a-vis one another is preferably constant, however. Likewise, the height of the pyramidal elevation is preferably greater in areas with a lower flow velocity than in areas with a higher flow velocity.

According to an especially effective example, a number of elevations are arranged along the leading edge of the flow body and the diagonal lengths of the rhombic base are greater in areas with a lower flow velocity. At the same time, at least three series of elevations are formed in the direction of flow; the diagonal lengths of the rhombic base preferably correspond to the length of the diagonals of the upstream elevation in the direction of flow from the upstream series in the direction of flow. It is only the case that the heights of the pyramidal elevations are reduced from series to series; the heights of the elevations that belong to a series can be different (in accordance with one embodiment).

In all of the embodiments, the flow body can be directly structured from the base material of the flow body or on a coating that is applied to the flow body.

In addition to the flow body, a different aspect of the invention also relates to a method for manufacturing a flow body with a resistance-reducing surface. The surface of the flow body is structured via a laser beam here in such a way that the surface will have at least one pyramidal elevation or the other structures that are described. In accordance with one embodiment, the base material of an existing flow body is directly structured. In accordance with a further design form, foil or the like is applied that has a coated surface and, as an even further embodiment, a coating is applied at first to the existing base material of the flow body and it is then preferably structured via a laser.

In accordance with another embodiment, the structuring is applied to the base material of the flow body in the form of a coating or elevations that are built up in a different way. If the elevation is applied on a coating or is formed by it, this will preferably involve a layer that remains firmly adherent up to an acceleration of at least 40 g and that is abrasion-resistant, heat-resistant and corrosion-resistant.

In accordance with a further embodiment, the surface of the flow body is built up with several layers. The surface of the flow body is preferably made up of two or three layers. If it is made up of two layers, the first layer is formed with the base material of the flow body by melting and smoothing the base material via laser pulses in the range of 7 to 15 µm, preferably 10 µm. The wear-resistant layer is then applied to it.

In the embodiment in which the surface of the flow body is made up of three layers, the first layer is once again formed with the base material of the flow body by melting and smoothing the base material via laser pulses in the range of 7 to 15 µm, preferably 10 µm. The second layer is formed from the smoothed surface of the first layer by additionally micro-hardening it in a range of 3 to 5 µm via laser pulses. A firmly adhering, wear-resistant third layer that has a layer thickness of 1 to 2 µm, preferably 1.5 µm, is applied to the hardened layer.

The third structured layer is preferably made up of diamond, titanium, tantalum or tungsten carbide or similar hard materials such as titanium nitride or silicon carbide, or glass steel (preferably produced from the base material). The third layer can also be created by introducing titanium, tantalum or tungsten-carbide particles or titanium nitride in a boundary area of the preferably micro-hardened layer under it.

This surface layer is structured via laser pulses, preferably with a period of between 500 and 700 nm and, as a special preference, around 600 nm, and depth of 200 to 500 nm as a preference. It turned out, surprisingly, that this structuring substantially reduces friction. This effect is enhanced when the microstructure involves geometrically similar elevations that are applied on a macroscopic basis to the surface of the flow body.

Further details of the invention will follow from the drawings based on the description.

The feature combinations disclosed in the examples that have been described are not intended to have a limiting effect on the invention; rather, the features of the various design forms can also be combined with one another.

DETAILED DESCRIPTION OF THE PREFERRED EMBODIMENTS

Figure 1:
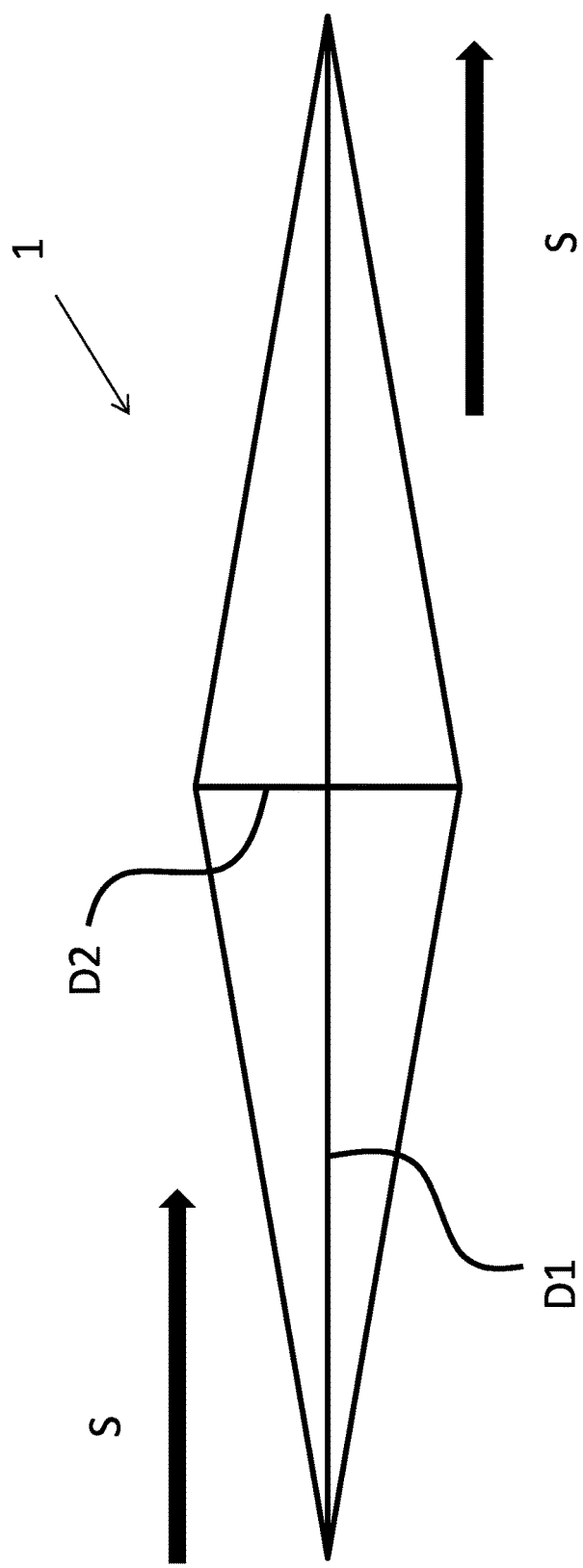
FIG. 1 shows a schematic top view of a pyramidal elevation.

A top view of a pyramidal elevation 1 on the surface of the flow body as per the invention is schematically shown in FIG. 1. The arrow S represents the direction of flow of the flow medium here that prevails on the surface of the flow body. It is evident from this that the elevation is arranged on the surface of the flow body in such a way that the diagonal D1 of the rhombic base of the pyramidal elevation that has the greater length in comparison to the second diagonal D2 of the base is aligned in the direction of flow S. The second diagonal D2 is therefore aligned orthogonally to the direction of flow S. The acute angle of the rhombic base of the pyramidal elevation 1 is preferably between 15° and 30° and is around 20° as shown here.

Figure 2:
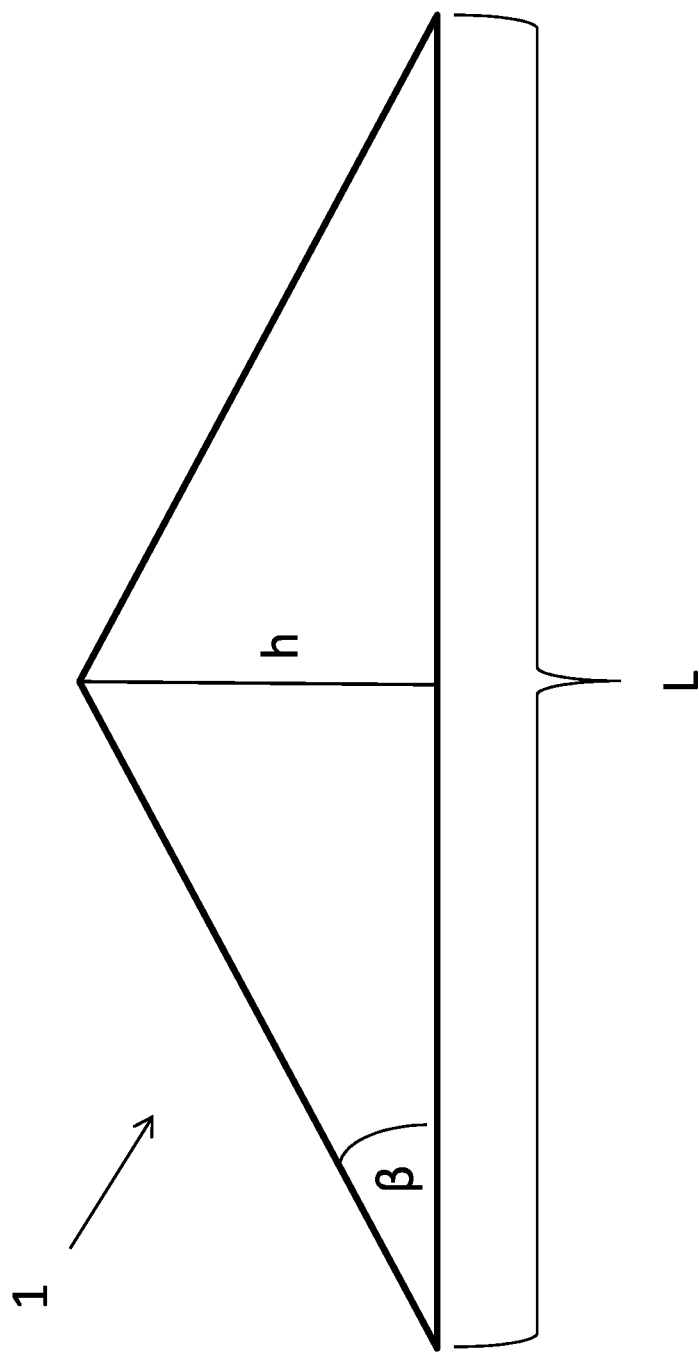
FIG. 2 shows a side view of a pyramidal elevation.

FIG. 2 shows a side view of the pyramidal elevation 1 of the surface-structured flow body. As shown here, the pyramidal elevation 1 has a height h that corresponds to around one-fourth of the length of the diagonal D1 that is aligned lengthwise to the direction of flow S. The pyramidal elevation 1 shown here can have a length L of the diagonal D1 aligned in the direction of flow of between 3 nm and 30 mm, but preferably 300 nm.

Figure 3:
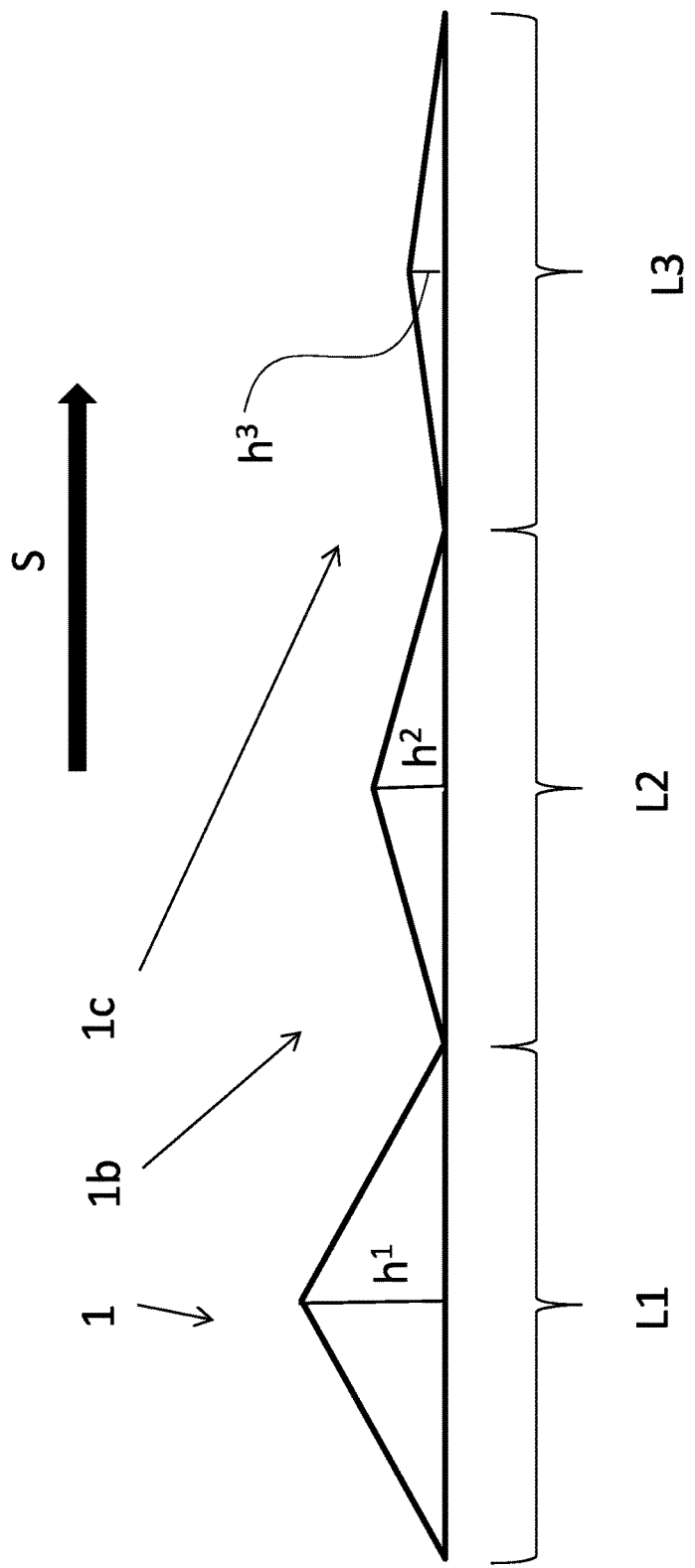
FIG. 3 shows a sectional view in the direction of flow of an embodiment.

FIG. 3 shows a sectional view of the flow body in the direction of flow S. In accordance with the embodiment shown here, several pyramidal elevations 1, 1b, 1c are provided one behind the other in the direction of flow S that, as shown here, have the same diagonal lengths D1, D2 and the same lengths L1, L2 and L3; their heights h are halved, however, in the direction of flow S with each subsequent pyramidal elevation.

Figure 4:
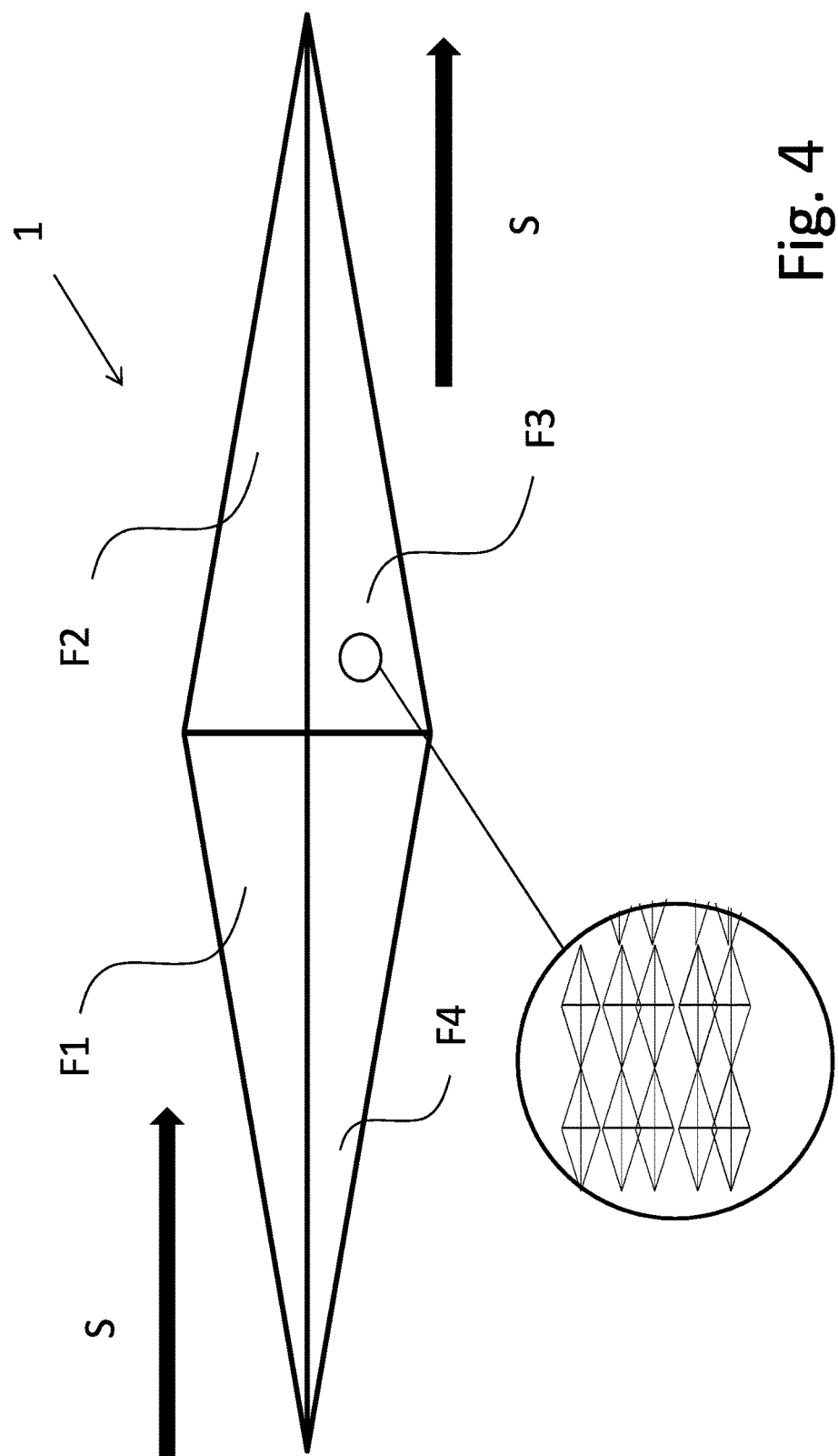
FIG. 4 shows a top view of an elevation with further elevations similar to itself.

FIG. 4 shows a pyramidal elevation 1 that has pyramidal elevations 1 on its four side areas F1, F2, F3 and F4 that are reduced by 1/100 to 1/10 vis-a-vis the pyramidal elevation 1 on which they rest. The smaller elevations that are shown in an enlarged fashion in a detailed view are geometrically self-similar to the pyramidal elevation 1 on which they rest.

Figure 5:
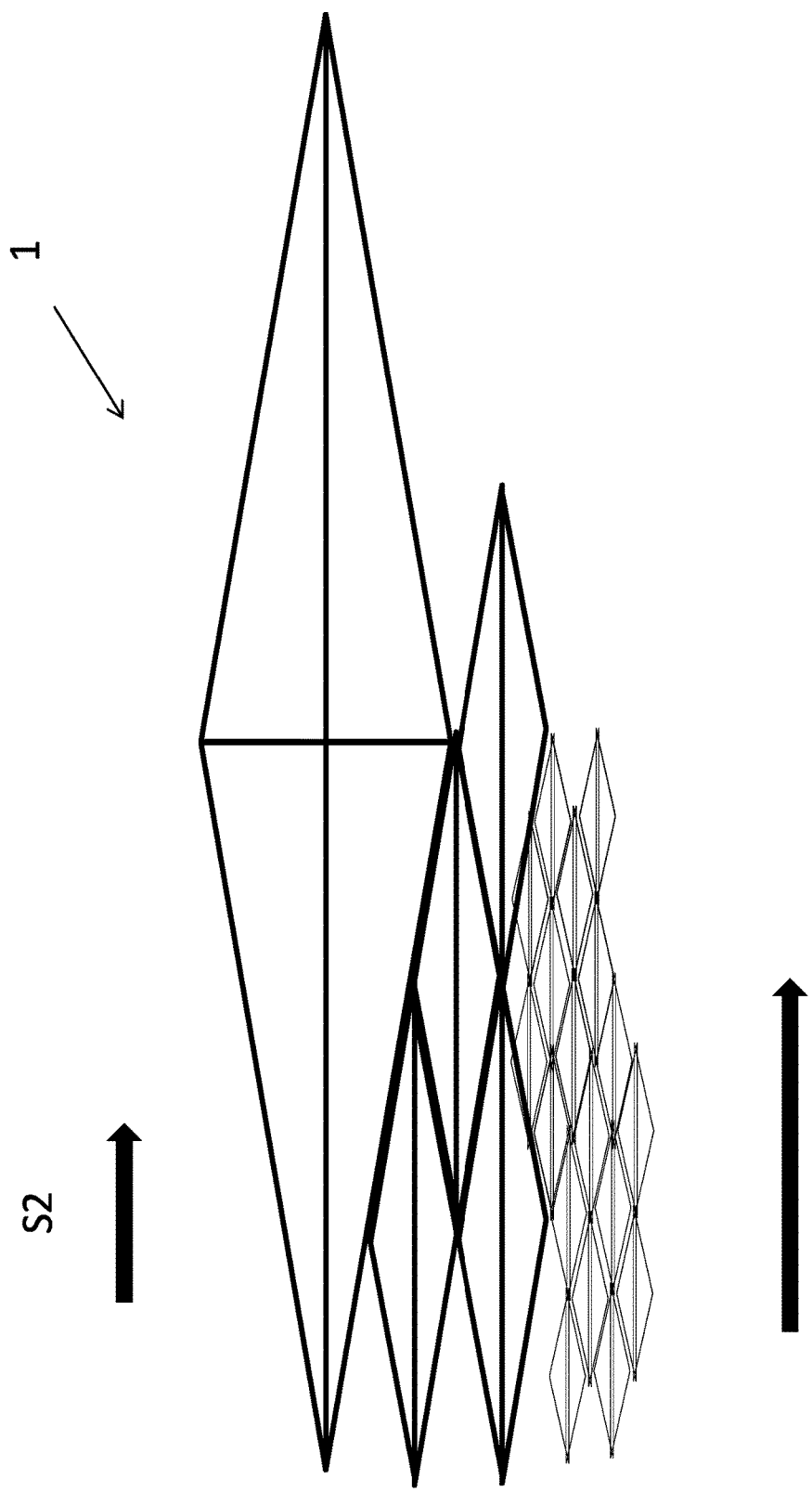
FIG. 5 shows a top view of a further design form of the flow body with pyramidal elevations of different sizes.

FIG. 5 shows a further embodiment of the invention in a schematic top view. Elevations 1 with different dimensions are provided here orthogonally to the direction of flow S that are, however, geometrically similar with respect to their rhombic bases. The dimensions are smaller in the areas 51 in which a greater flow velocity prevails on the flow body in the operating state than in areas S2 with a lower flow velocity over the surface of the body.

LIST OF REFERENCE NUMERALS

1 Elevation
D1 Diagonal in the direction of flow

D2 Diagonal orthogonal to the direction of flow
S Direction of flow
H Height der pyramidal elevation
L Length der pyramidal elevation
F1-F4 Side areas of the pyramidal elevation
1b, 1c Elevations behind one another in the direction of flow

The invention claimed is:

1. Flow body with a surface having a pyramidal elevation (1) in at least one location, said pyramidal elevation having a rhombic base, wherein a first diagonal (D1) of the rhombic base is aligned in the direction of flow (S) when the flow body is in use and said first diagonal has a length ratio of between 5 and 8 with respect to a second diagonal (D2), and wherein the surface of the pyramidal elevation (1) likewise has pyramidal elevations whose dimensions are, however, reduced to 1/10 to 1/100 compared to the dimensions of the first elevation on which they rest.

2. Flow body according to claim 1, characterized in that the height (H) of the elevation approximately corresponds to one-fourth of the diagonal length (D1) aligned in the direction of flow (S).

3. Flow body according to claim 1 having at least two pyramidal elevations (1) arranged directly behind one another in the direction of flow (S), wherein the height (H) of the elevation (1) arranged further downstream in the direction of flow (S) is only half as large as the elevation (1) that is upstream in the direction of flow (S).

4. Flow body according to claim 1, characterized in that the pyramidal elevation (1) or the pyramidal elevations are created by structuring the base material of the flow body.

5. Flow body according to claim 1, characterized in that the pyramidal elevation (1) or the pyramidal elevations are formed on a coating that is applied to the base material of the flow body.

6. Flow body according to claim 1, characterized in that the surface has at least 2 pyramidal elevations (1) arranged at an offset to one another and essentially orthogonal with respect to the direction of flow.

7. Flow body according to claim 6, characterized in that the elevations (1) are arranged along the leading edge.

8. Flow body according to claim 6, characterized in that the elevations (1) that are arranged at an offset to one another and essentially orthogonal with respect to the direction of flow (S) do in fact have the same length ratios of their diagonals (D1), (D2) but have a different overall length.

9. Flow body according to claim 3, characterized in that the diagonal lengths (D1), (D2) of an elevation (1) on the surface that is located in an area of greater flow velocity (51) are smaller than a second elevation arranged in an area with a lower flow velocity (S2).

* * * * *